(12) United States Patent
Laymon et al.

(10) Patent No.: US 12,338,940 B2
(45) Date of Patent: Jun. 24, 2025

(54) PIG DETECTOR

(71) Applicant: Enduro Pipeline Services, Inc., Tulsa, OK (US)

(72) Inventors: Matthew S. Laymon, Collinsville, OK (US); Dwane O. Laymon, Tulsa, OK (US)

(73) Assignee: Enduro Pipeline Services, Inc., Tulsa, OK (US)

(*) Notice: Subject to any disclaimer, the term of this patent is extended or adjusted under 35 U.S.C. 154(b) by 789 days.

(21) Appl. No.: 17/540,978

(22) Filed: Dec. 2, 2021

(65) Prior Publication Data
US 2022/0252201 A1 Aug. 11, 2022

Related U.S. Application Data

(60) Provisional application No. 63/146,142, filed on Feb. 5, 2021.

(51) Int. Cl.
*F16L 55/48* (2006.01)
(52) U.S. Cl.
CPC .................. *F16L 55/48* (2013.01)
(58) Field of Classification Search
CPC ...................................................... F16L 55/48
See application file for complete search history.

(56) References Cited

U.S. PATENT DOCUMENTS

| 3,306,251 | A | * | 2/1967 | Walter | F16L 55/48 |
|---|---|---|---|---|---|
| | | | | | 116/285 |
| 3,478,717 | A | * | 11/1969 | Kidd | H01H 36/0073 |
| | | | | | 335/207 |
| 4,079,619 | A | | 3/1978 | Dobesh | |
| 4,491,018 | A | * | 1/1985 | Stringer | H01H 36/0046 |
| | | | | | 200/61.42 |

(Continued)

FOREIGN PATENT DOCUMENTS

JP 5438631 3/2014

OTHER PUBLICATIONS

Office Action Received in Canada Patent Application No. 3,147,576 dated Feb. 16, 2024; Canadian Intellectual Property Office.
(Continued)

*Primary Examiner* — Kristina M Deherrera
*Assistant Examiner* — Tania Courson
(74) *Attorney, Agent, or Firm* — Head, Johnson, Kachigian & Wilkinson, PC

(57) ABSTRACT

A device for indicating the passage of a pig beyond a predetermined location in a pipeline comprising a pig detector connected to a pipeline and communicating with the interior of the pipeline through an opening at the location. The device may comprise a trigger mounted in the pig detector and adapted to project into the interior of the pipeline, an indicator housing located at a distance from the pig detector; an indicator being vertically slidably mounted within the indicator housing; and a push/pull control cable (Continued)

with a first end attached to the trigger and a second end attached to the indicator, such that, when a pig moves in the pipeline past the trigger and actuates the trigger, the push/pull control cable allows the indictor to move upwardly beyond the indicator housing so as to provide a visual indication that the pig has passed by.

1 Claim, 7 Drawing Sheets

(56) References Cited

U.S. PATENT DOCUMENTS

| | | | | |
|---|---|---|---|---|
| 4,596,204 A * | 6/1986 | Ralls | ............. | F16L 55/48 116/303 |
| 5,263,220 A * | 11/1993 | Campbell | ............. | B08B 9/055 15/104.063 |
| 6,357,384 B1 * | 3/2002 | Laymon | ............. | F16L 55/48 116/281 |
| 6,823,751 B1 * | 11/2004 | Young | ............. | F16L 55/48 73/1.18 |
| 6,857,329 B2 | 2/2005 | Savard | | |
| 7,861,665 B2 * | 1/2011 | Rankin | ............. | F16L 55/48 116/303 |
| 8,109,162 B2 | 2/2012 | Laymon | | |
| 9,248,477 B2 * | 2/2016 | Klemm | ............. | B08B 9/027 |

OTHER PUBLICATIONS

Extended European Search Report received in European Patent Application No. 22275010.1 dated Jul. 8, 2022: European Patent Organization.

* cited by examiner

PIG DETECTOR

CROSS REFERENCE

This application is based on and claims priority to U.S. Provisional Patent Application Ser. No. 63/146,142, filed Feb. 5, 2021, which is incorporated herein in its entirety by reference.

BACKGROUND OF THE INVENTION

Field of the Invention

This invention relates generally to devices for determining the position of a pipeline pig in a pipeline. More particularly, but not by way of limitation, the present invention relates to an apparatus for signaling the passage of a pipeline pig beyond a predetermined point or points in a pipeline.

Description of the Related Art

The position of a pipeline pig within a pipeline is often determined via a pig detector, such as the one described in U.S. Pat. No. 8,109,162, which is incorporated by reference herein.

Existing art utilizes a series of rigid extension components, used together to separate the trigger and the indicator by a predetermined amount, allowing for the indicator to be above ground while the trigger is attached to the pipeline and buried.

A problem with the existing art is that the extension components are rigid and require that the depth of cover be known at the time of purchase. This dictates that the pig signal extensions are specific to their installation depth parameter and allows for no deviation in depth of cover or advance purchase when depth of cover is not expressly known.

Based on the foregoing, it is desirable to provide a pig detector where the rigid portions of the extension mechanism are replaced with an upper and lower housing and a flexible push/pull control cable. This may allow the trigger and indicator to be separated by any distance, up to the full length of the cable. Excess cable can be coiled and buried when the pipeline is backfilled.

SUMMARY OF THE INVENTION

In general, in a first aspect, the invention relates to a device for indicating passage of a pig beyond a predetermined location in a pipeline, the device comprising: a pig detector for connecting to a pipeline and communicating with the interior of the pipeline through an opening at the location; a trigger slidably mounted in the pig detector and adapted to project downwardly into the interior of the pipeline through the opening; an indicator housing located at a distance from the pig detector; an indicator being vertically slidably mounted within the indicator housing; and a push/pull control cable with a first end attached to the trigger and a second end attached to the indicator, such that, when a pig moves in the pipeline past the trigger and actuates the trigger, the push/pull control cable allows the indictor to move upwardly beyond the indicator housing so as to provide a visual indication that the pig has passed by.

Figures 1, 2:
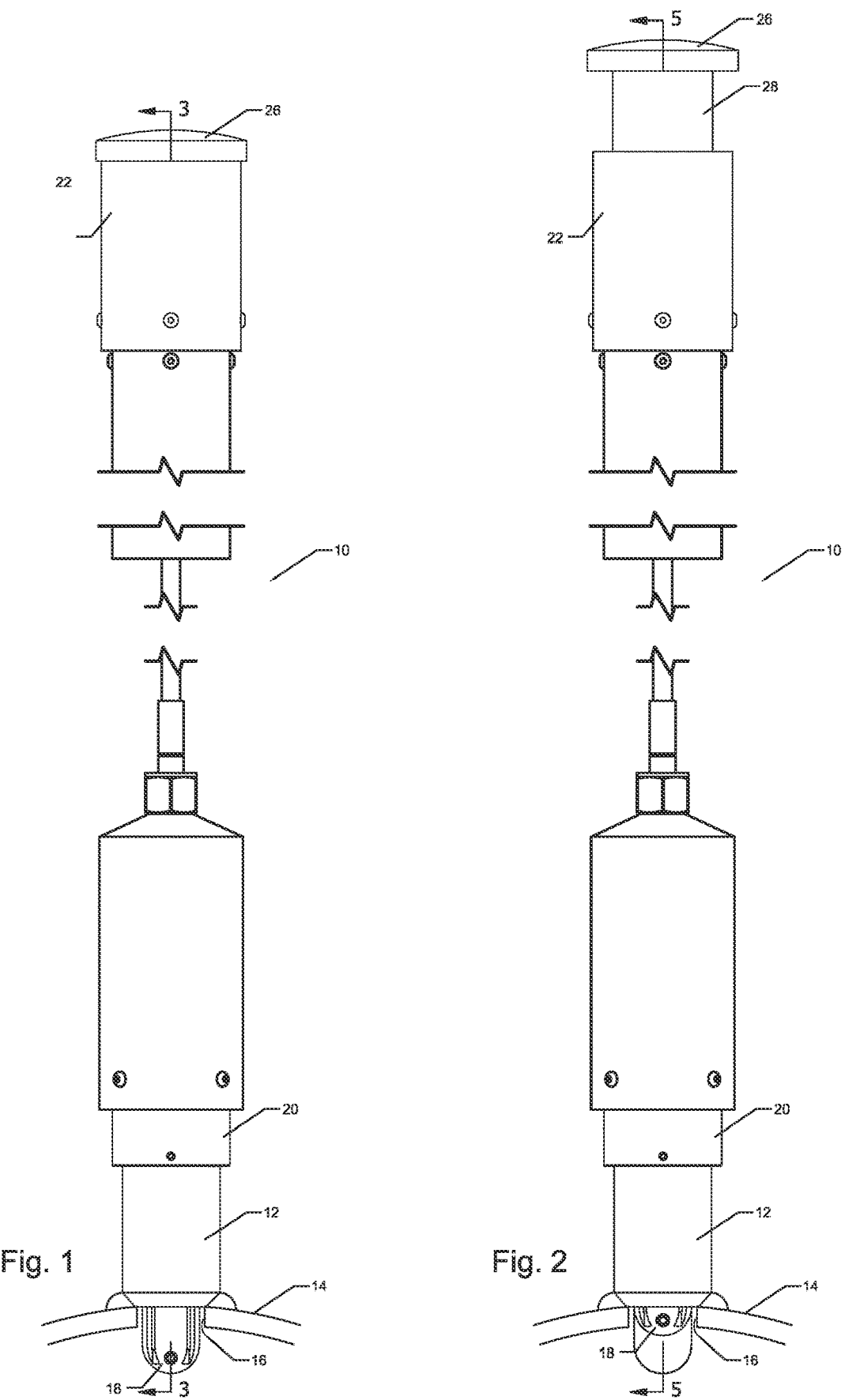
FIG. 1 illustrates an elevation of the pig detector of the present invention showing the trigger element projecting inwardly into the pipeline.
FIG. 2 illustrates a view similar to FIG. 1 but showing the trigger element in its upmost position, with the indicator also being elevated.

Other advantages and features will be apparent from the following description and from the claims.

DETAILED DESCRIPTION OF THE INVENTION

The devices and methods discussed herein are merely illustrative of specific manners in which to make and use this invention and are not to be interpreted as limiting in scope.

While the devices and methods have been described with a certain degree of particularity, it is to be noted that many modifications may be made in the details of the construction and the arrangement of the devices and components without departing from the spirit and scope of this disclosure. It is understood that the devices and methods are not limited to the embodiments set forth herein for purposes of exemplification.

In general, in a first aspect, the invention relates to a pig detector that is adapted to be mounted on the outside of a pipeline for the purpose of determining the passage of a pig past the point of attachment. The pig detector may include a pipe nipple connected to the pipeline and communicating with the interior of the pipeline through an opening. A trigger ball may project downwardly from the pipe nipple through the opening and into the interior of the pipeline and may be adapted to be contacted by a passing pig. The pipe nipple may connect with an indicator housing in which a cylindrical indicator is vertically slidably mounted.

Within the housing may be mounted a plurality of catch fingers, which may be pivotal towards and away from the central axis of the housing and which may be provided with catches. The trigger may connect with an actuator, which may be positioned to bear against the sides of the catch finger to cause them to pivot outwardly away from each other when the actuator moves up vertically. The catch fingers may be provided with a garter spring to urge them radially inwardly towards the central axis. The actuator may be resiliently urged downwardly by an actuator spring so as to cause the trigger to protrude into the space in the pipeline. A push/pull control cable may be attached at each end to a lock pin and indicator, respectively. A lower housing may provide a seal against debris and house the attachment of the push/pull control cable to the lock pin. An upper housing may provide a seal against debris and may house the attachment of the push/pull control cable to the indicator. An indicator spring may be mounted within the housing to resiliently urge the indicator upwardly beyond the indicator housing so as to be visible and to provide indication that a pig has passed by. A lock pin may be attached to the lower end of the push/pull control cable and may be provided with a pointed end which may be adapted, when moved downwardly, to pry the catch fingers apart and also the lock pin may be provided with an upper surface adapted to be engaged by the catches on the catch fingers to hold the indicator totally within the housing against the action of the second spring.

When a pig moves in the pipeline past the trigger and actuates the trigger, the actuator may bear against the fingers and separate them radially against the action of the garter spring to release the lock pin and push/pull control cable and allow the indicator to move upwardly within the indicator housing so as to provide a visual indication that a pig has passed.

Referring to the drawings in detail, FIGS. 1 and 2 show a pig detector 10 comprised of a pipe nipple 12 which may be connected to the outside of a pipe 14 in any conventional manner, for example, by welding. The pipe 14 may have a hole 16 therein through which a ball (trigger) 18 protrudes. The ball 18 may be connected to the internal components of the pig detector 10 in a manner later to be described. The exterior of the pig detector 10 also shows a collar 20, an indicator housing 22, and a cap 26.

In the position shown in FIG. 1, the ball 18 is in its lowermost position, indicating that a pig has not passed the location of the pig detector 10 so that the trigger ball 18 is not pushed upwardly. However, in the position shown in FIG. 2, the trigger ball 18 is disposed upwardly indicating that a pig has just passed, such that the internal mechanism has been actuated to release a cylinder 28, which is also referred to as an indicator. In FIG. 2, the indicator 28 merely indicates that a pig has passed by, and it can be very easily distinguished from the appearance of the pig detector in FIG. 1.

Figure 3:
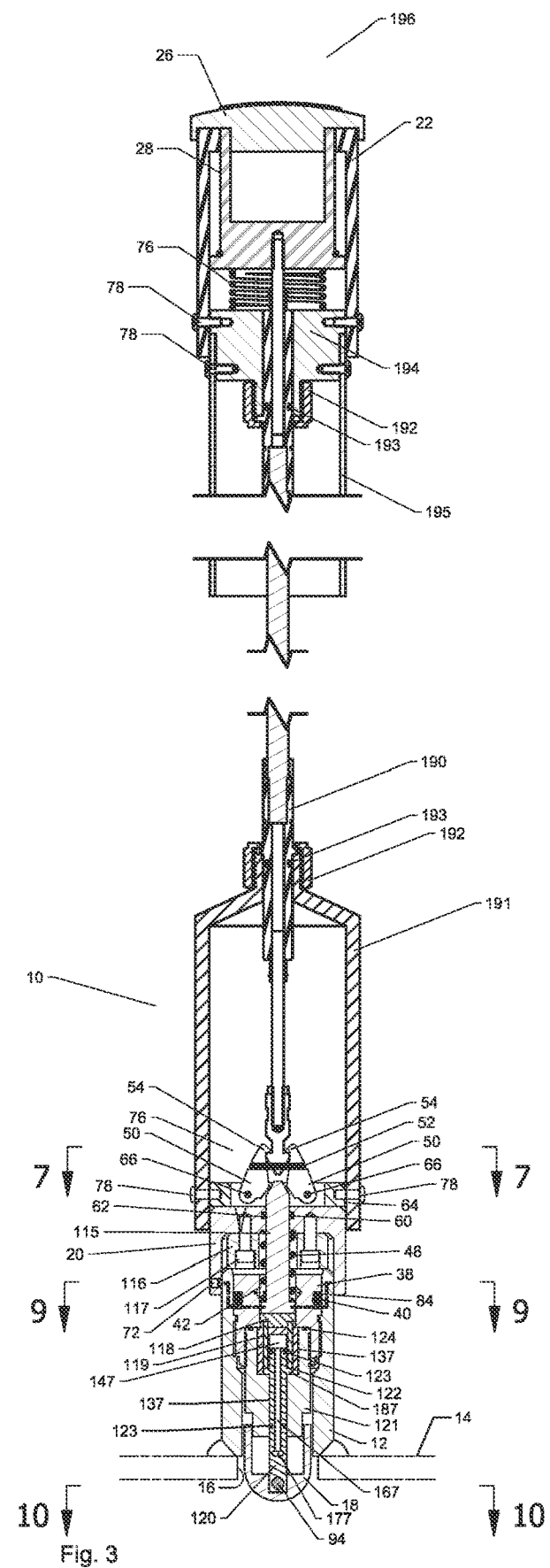
FIG. 3 illustrates a longitudinal sectional view taken along section line 3-3 of FIG. 1.

Referring now to FIG. 3, which is a longitudinal cross-section through the pig detector and the pipe 14, the trigger ball 18 may be connected to the lower end of the plunger 120 which may connect with an actuator 115 through interconnecting trigger pins 119 and trigger pin plate 118. The plunger 120 may be adapted to be slidably received within the lower end of a housing arrangement which may have a lower end 121 and an upper end 38. The plunger 120, the trigger plunger cap 122, and the interconnecting trigger pins 119 and trigger pin plate 118 may be all slidably received in the lower housing 121 which may be interconnected to the upper housing 38 by various threaded means shown in the drawing. The various elements in the drawing located below housing 38 may be all variously lubricated and O-rings 40 and 84 may be provided. The lower housing may be provided with a cylindrical recess 137 in which the plunger 120, trigger plunger cap 122, and interconnecting trigger pins 119 and trigger pin plate 118 may be received. The trigger plunger cap 122 may be provided with a cylindrical recess 147 in which the upper end of the plunger may be received. The trigger plunger cap 122 may be maintained in a fixed position when the upper housing 38 is threaded to the lower housing 121. The interconnecting trigger pins 119 and trigger pin plate 118 may be maintained in a vertically glidable position by slidably mating the trigger pins 119 with trigger plunger cap holes 157 provided in the trigger plunger cap 122. The trigger pins 119 may extend completely through the trigger plunger cap 122 ready to engage the plunger 120 when it is activated by the trigger ball 18. The plunger 120 may include a lip 187 for alternately engaging a step in the lower housing recess 137 and trigger pins 119 depending on whether the trigger ball has been engaged. Two O-rings 123 may be mounted in suitable peripheral grooves in the plunger 120: one O-ring to engage and create a seal with the trigger plunger recess 147 and one O-ring to engage and create a seal with the lower housing recess 137. The plunger 120 may include a bypass port 167 running from the top of the plunger to a point just above where the plunger is connected to the trigger ball 18 where the bypass port vents via several vent holes 177 on the periphery of the plunger 120.

An O-ring 124 may be mounted in a suitable groove in the top of the lower housing 121 creating a seal with the upper housing 38. An O-ring 40 may be mounted in a suitable peripheral groove in the upper housing 38 and a backup O-ring 84 may also be mounted in the same groove immediately above the O-ring 40. A helical spring 48 may be received over the upper end of the actuator 115 and may extend within the recess 42 downwardly from the lower inside surface of the collar 20 to the lower surface of the actuator 115 for continually urging the trigger pin plate 118 and actuator 115 downwardly so that the ball 18 is also urged downwardly.

Above the top of the actuator 115 there may be mounted a plurality of catch fingers 50, which may be urged towards each other by means of a garter spring 52. The tops of the fingers 50 may be provided with catches 54 which may be adapted to be received over the top of a pointed lock pin 56 which may be attached to the lower end of a push/pull control cable 190. A lower connector housing 191 and O-ring 193 may provide a seal against debris and may house the attachment of the push/pull control cable 190 to the lock pin 56. A push/pull control cable 190 may be attached to a lower connector housing 191 by a compression nut 192. The push/pull control cable 190 may be attached at its upper end to a cylindrical indicator 28. The indicator 28 may be slidably received within an indicator housing 22. The indicator housing 22 may house the attachment of the push/pull control cable 190 to the indicator 28. An upper connector housing 194 and O-ring 193 may provide a seal against debris. The push/pull control cable 190 may be attached to the upper connector housing 194 by the compression nut 192. The upper end of an extension pipe 195 may be attached to the upper connector housing 194. The lower end of the extension pipe 195 may be affixed to the soil or other supporting structure to provide a means to position an indicator assembly 196 in a visible location.

Figure 6:
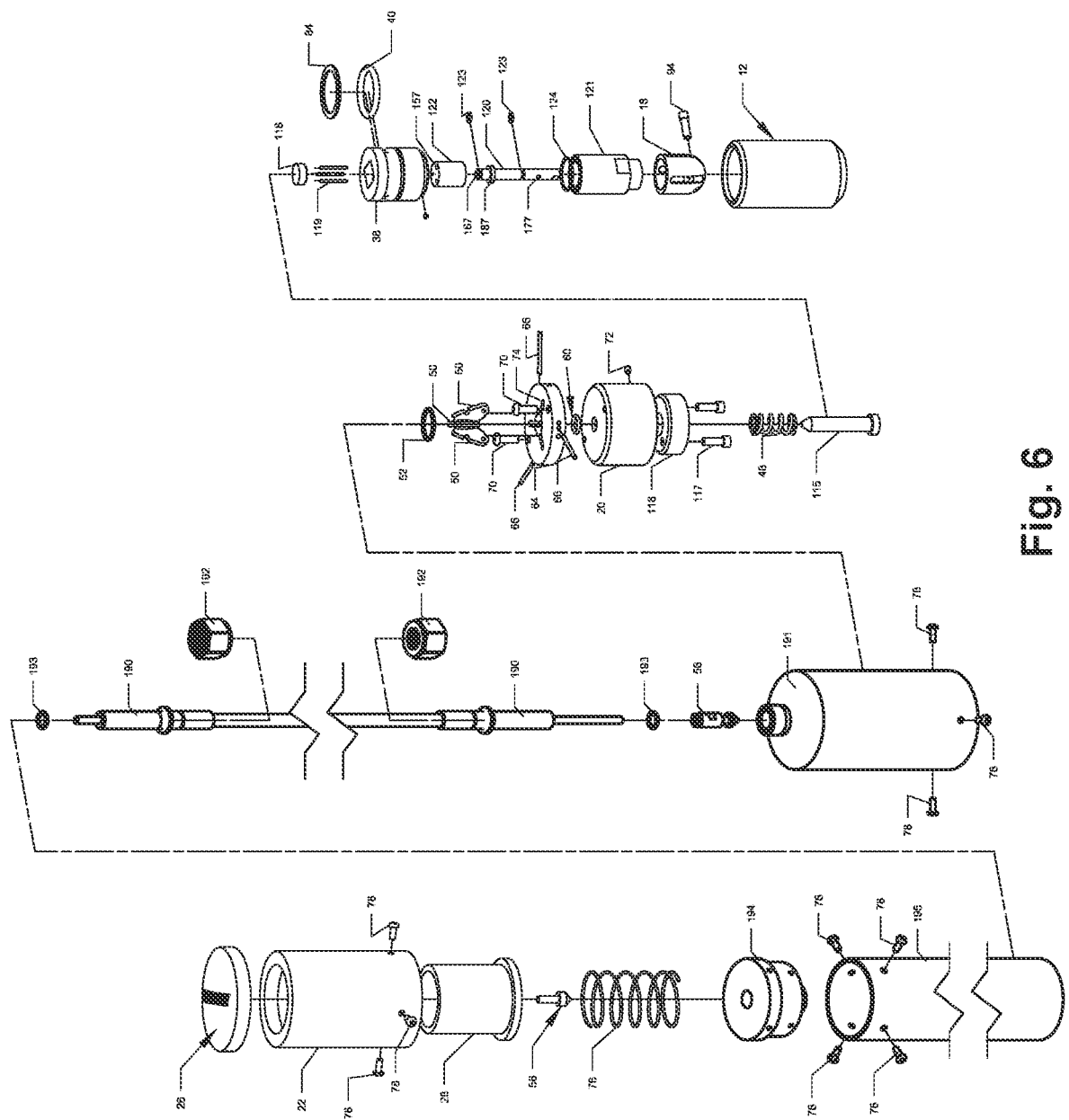
FIG. 6 illustrates an exploded view of the elements shown in FIGS. 1 through 5.

Whereas most elements of the pig detector may have been shown and described in relation to FIGS. 1 to 3, FIG. 6, nevertheless, is an exploded view that shows the manner in which the various elements may interconnect with each other as previously described in relation to FIGS. 1 to 3; FIG. 6 also illustrates additional elements not specifically shown in FIGS. 1 to 3.

Immediately above the collar 20 there is shown an O-ring 60, which may be adapted to be received in a recess 62 located in the upper portion of the collar 20, more particularly centrally in the bore which is provided for the actuator 115. A catch plate 64 may be provided for the catch fingers 50. Catch finger pins 66, of which there may be three in number, may be provided to permit pivoting of the fingers 50 in radial slots 74.

Referring also to FIG. 3, in addition to FIG. 6, the lower end of the push/pull control cable 190 may be threadedly received in a threaded opening at the upper end of the pointed lock pin 56, while the upper end of the push/pull control cable 190 may be threadedly received in a threaded opening at the bottom of the indicator 28. Thus, when the lock pin 56 is engaged by the fingers 50, as shown in FIG. 3, the indicator 28 may be fully enclosed within the indicator housing 22 and an indicator spring 76 may be compressed between the lower end of the indicator 28 and the upper connector housing 194. Four button-head screws 78 may pass through suitable holes in the indicator housing 22 and into the sides of the upper connector housing 194. Likewise, four button-head screws 78 may pass through suitable holes in the lower connector housing 191 and into the sides of the catch plate 64. The collar 20 may be provided with a brass tipped set screw 72 which secures the collar 20 onto the upper threaded end of the pipe nipple 12. Immediately below the collar 20 and directly above the upper housing 38 may be a pipe cap spacer 116 held into a fixed position on the underside of the collar 20 by pipe cap spacer bolts 117.

Figure 4:
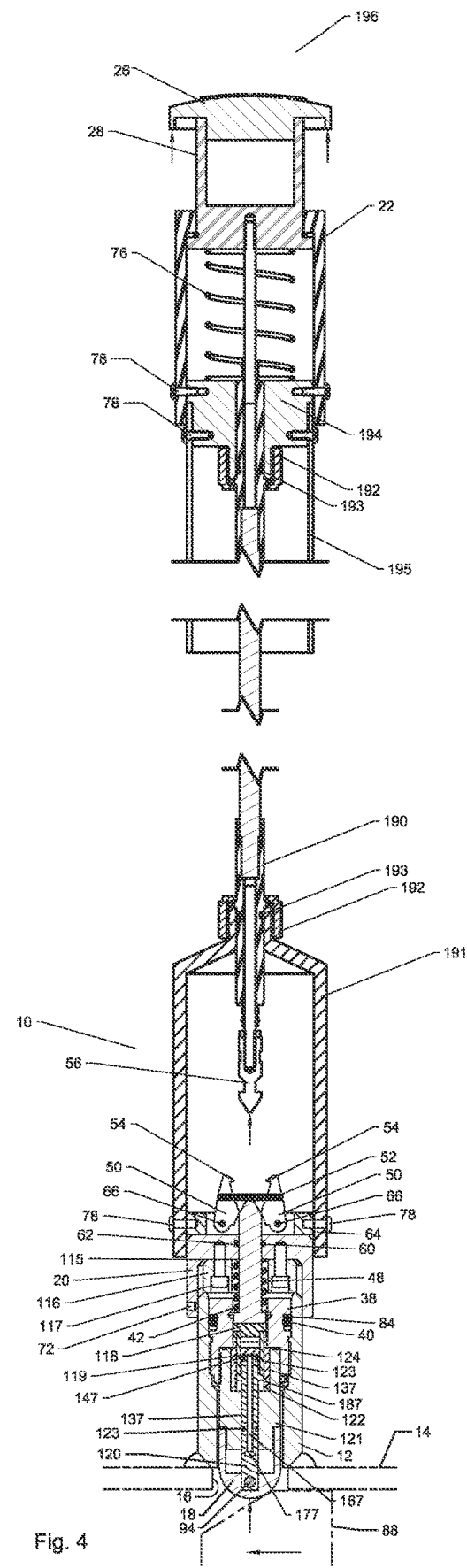
FIG. 4 illustrates a view similar to FIG. 3 but showing the trigger being released by a pig.
Figure 5:
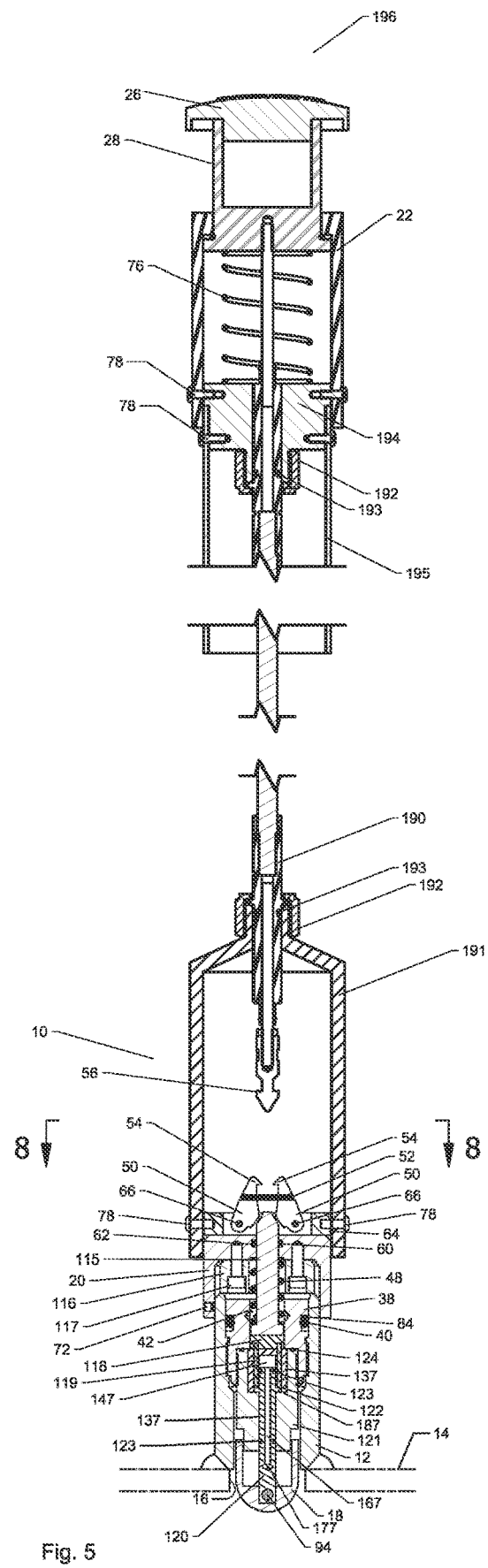
FIG. 5 illustrates a longitudinal sectional view taken along section line 5-5 at a time slightly after the position shown in FIG. 4.

Turning now to FIG. 4, when a pig 88 passes through the pipeline 14 and actuates the trigger 18, the actuator 115 may move upwardly and engage the sides of the three catch fingers 50 causing them to pivot outwardly and release the lock pin 56 and the push pull control cable 190. At this time, the spring 76 may commence to raise the indicator 28. FIG. 5 represents the condition of the pig detector 10 after the pig 88 has passed completely by. In the FIG. 5 position, the spring 76 has raised the indicator 28 to its uppermost position so that it serves as a signal to anyone looking that way that the pig has passed this particular pig detector. At the same time, the spring 48 may move the trigger 18 back to its original position and the garter spring 52 may move the fingers 50 back to their original position. If it is desired to recock the pig detector, all one needs to do is push downwardly on the cap 26 until the lock pin 56 is engaged by the catches 54 at the tops of the catch fingers 50.

Figure 7:
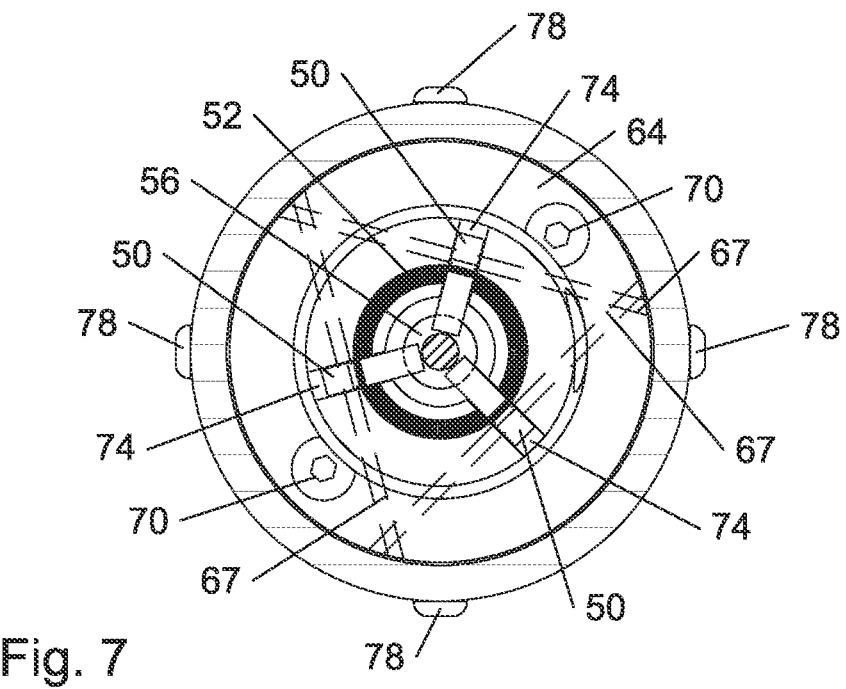
FIG. 7 illustrates a transverse sectional view taken along section line 7-7 of FIG. 3.
Figure 8:
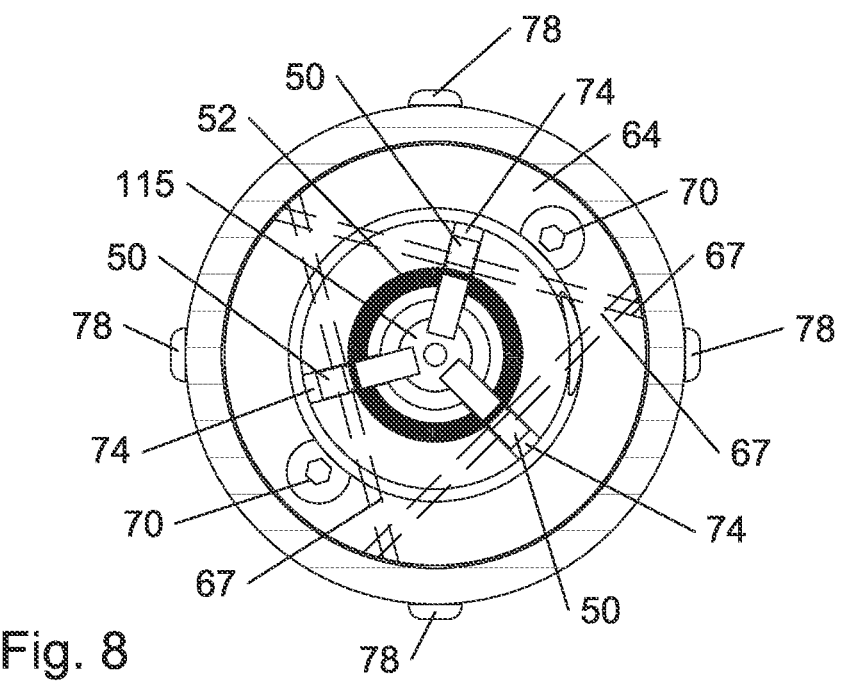
FIG. 8 illustrates a transverse sectional view taken along section line 8-8 of FIG. 5, after the catch fingers have been returned to their original position by the garter spring.

FIGS. 7 and 8 relate to enlarged details of the catch finger assembly. FIG. 7 is a sectional view taken along section line 7-7 of FIG. 3, showing the catch fingers 50 in engagement with the lock pin 56. Note that the fingers 50 may be urged pivotally inwardly towards each other by means of the garter spring 52 which encircles the fingers midway of their ends. FIG. 8 is a sectional view taken along section line 8-8 of FIG. 5 after the lock pin 56 has been released. The garter spring 52 has returned the fingers 50 to their original position as shown in FIG. 5 and the actuator 115 is bearing against the lower sides of the fingers. FIGS. 7 and 8 also show three triangularly arranged holes or bores 67 which may extend like chords across the catch plate 64 so as to receive therein the catch finger pins 66 which permit the pivoting of the fingers 50 in the radial slots 74.

Figure 9:
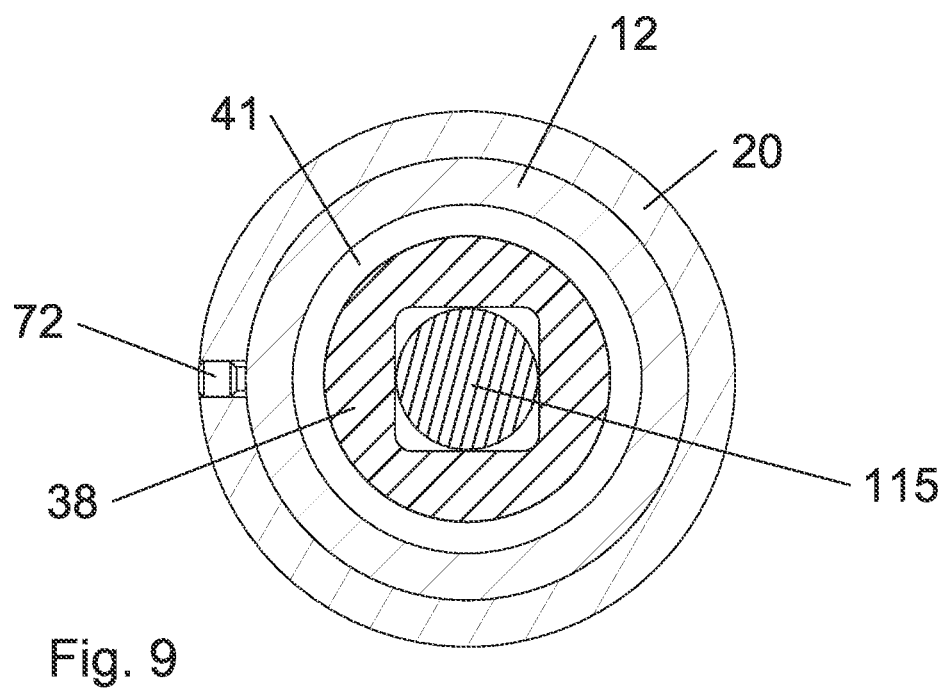
FIG. 9 illustrates a transverse sectional view taken along section line 9-9 of FIG. 3.

FIG. 9 is a transverse sectional view taken along section line 9-9 of FIG. 3 and cuts through the collar 20 roughly in the neighborhood of the set screw 72. Housing 38 is shown separated from the pipe 12 by means of an annular space 41 which represents the recess in which the O-ring 40 and 84 may be located.

Figure 10:
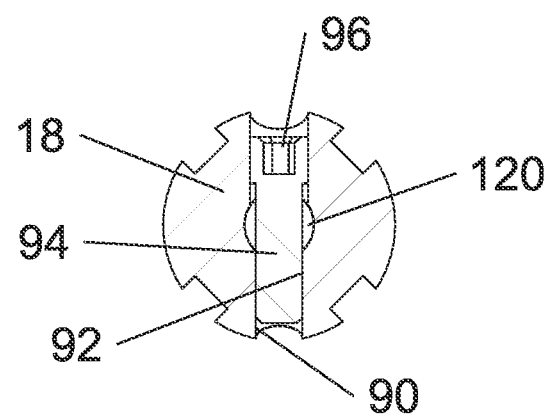
FIG. 10 illustrates a transverse sectional view taken along section line 10-10 of FIG. 3.

FIG. 10 is a sectional view of the bottom end of the trigger 18 showing its attachment to the plunger 120. The trigger 18 may be provided with a transverse opening 90 which may be in alignment with a transverse opening 92 in the plunger 120. A pin 94 having a set screw 96 at one end thereof may be adapted to pass through the opening 90 in the trigger 18 and also through the hole 92 in the plunger 120 to hold the trigger 18 in place.

While the invention has been described with a certain degree of particularity, it is to be noted that modifications may be made in the details of the invention's construction and the arrangement of its components without departing from the spirit and scope of this disclosure. It is understood that the invention is not limited to the embodiments set forth herein for the purposes of exemplification.

What is claimed is:

1. A device for indicating passage of a pig beyond a predetermined location in a pipeline, the device comprising:
   a pig detector for connecting to the pipeline and communicating with the interior of the pipeline through an opening at the location;
   a trigger slidably mounted in the pig detector and adapted to project downwardly into the interior of the pipeline through the opening;
   an indicator housing located at a distance from the pig detector;
   an indicator being vertically slidably mounted within the indicator housing; and
   a flexible push/pull control cable with a first end attached to the trigger and a second end attached to the indicator, such that, when the pig moves in the pipeline past the trigger and actuates the trigger, the push/pull control cable allows an indicator spring to resiliently urge the indicator to move upwardly beyond the indicator housing so as to provide a visual indication that the pig has passed by.

* * * * *